United States Patent

[11] 3,603,791

| [72] | Inventors | Roger Chenault;<br>Guy Portal; Emile Porrot; Raymond<br>Prigent, all of Fontenay-Aux-Roses, France |
|---|---|---|
| [21] | Appl. No. | 813,830 |
| [22] | Filed | Apr. 7, 1969 |
| [45] | Patented | Sept. 7, 1971 |
| [73] | Assignee | Commissariat A L'Energie Atomique<br>Paris, France |
| [32] | Priority | Apr. 18, 1968 |
| [33] | | France |
| [31] | | 148,588 |

[54] METHOD AND DEVICE FOR READING THERMOLUMINESCENT DOSIMETERS
8 Claims, 3 Drawing Figs.

| [52] | U.S. Cl. | 250/71.5, 250/71, 250/83.1 |
|---|---|---|
| [51] | Int. Cl. | G01t 1/11 |
| [50] | Field of Search | 250/71, 71.5, 83.1 |

[56] References Cited
UNITED STATES PATENTS

| 3,288,997 | 11/1966 | McCall | 250/71.5 |
|---|---|---|---|
| 3,371,209 | 2/1968 | Rutland et al. | 250/106 SC |
| 3,376,416 | 4/1968 | Rutland et al. | 250/71 |
| 3,497,671 | 2/1970 | Schayes et al. | 250/71 |

*Primary Examiner*—Archie R. Borchelt
*Attorney*—Cameron, Kerkam & Sutton

ABSTRACT: Thermoluminescent dosimeters (e.g., Lif, $CaF_2$) are heated from the variable initial temperature of a dosimeter reader to a predetermined temperature which is higher than the range of emission of peaks which are subject to "fading" for the emission of such peaks to be complete. Immediately after that step, the temperature of the dosimeter is progressively increased to a temperature which is sufficient to cause the emission of all significant peaks and the total light emission of the dosimeter during said temperature rise is then measured. A reader including a temperature regulation circuit is described which automatically carries out the above sequence.

METHOD AND DEVICE FOR READING THERMOLUMINESCENT DOSIMETERS

The present invention is concerned with a method of reading thermoluminescent dosimeters as well as a device for carrying out said method.

The term "thermoluminescent dosimeter" is understood to mean an object which utilizes the property of a number of different substances such as lithium fluoride and activated calcium fluoride of storing a part of the energy received by such substances in the form of ionizing radiations and of restoring said energy in the form of light when said substances are heated to a sufficiently high temperature above a threshold which depends especially on the nature of the substance. A thermoluminescent dosimeter is usually designed in the form of a pellet or strip which can contain the sensitive substance in different forms, especially in the form of a powder which is sintered or sheathed in transparent plastic and can be either uncovered or encased in a transparent sheath. The reading operation, that is to say the operation which consists in principle in heating the dosimeter to a temperature above the aforesaid threshold, in measuring the quantity of light emitted by said dosimeter and in deducing the absorbed radiation dose therefrom by referring to calibration curves which have been plotted experimentally.

In practice, the reading is complicated by the existence of related phenomena and practical problems. The light emission of the dosimeter at the time of progressive heating from the ambient temperature exhibits several peaks at different temperatures, only a few of which are representative of the radiation dose received since the previous reading. In fact, the emission peaks which appear at the time of the initial heating step up to a temperature which varies between 100° C. and 150° C. in respect of LiF are subject to a process of weakening in time or "fading" which makes them unsuitable for the dosimeter. Although the peaks referred to are representative of the absorbed dose immediately after exposure to radiation, said peaks become weaker and finally disappear after a few days. The light emission of the dosimeter when this latter is heated to a point beyond a further threshold corresponding to several hundred degrees depends not only on the absorbed radiation received but also on other excitations to which the dosimeter may have been subjected. In consequence, unless a number of precautions are accepted, only the light emitted by the substance within a given temperature range which is variable according to the nature of the substance can be taken into consideration during the reading operation.

A further problem is of a constructive and material nature: the heating systems employed in the dosimeter reading appliances evidently have a fairly appreciable thermal inertia. A certain period of time must therefore be permitted to elapse between the end of one reading operation and the beginning of the following operation in order that the heating cycle which is applied to all the dosimeters which are read in succession should be the same. Thus, there is usually a waiting period of a few minutes which reduces the reading rate to a considerable extent. Some attempt has been made to overcome this difficulty by measuring only the light emission which takes place above a given temperature as proposed by R. Schayes and C. Brooke in an article entitled "Application of Thermoluminescence to Dosimetry" (MBLE Review, volume VI, No. 1, 1963, p. 25). This solution appears to be feasible when the starting temperature is always the same. But in the readers which have been employed up to the present time, heating is carried out in a continuous process at a variable temperature, and vary appreciable differences between results are accordingly observed.

The present invention is directed to the basic concept of a reading method and device which meet practical requirements more effectively than those which have been proposed in the prior art, particularly insofar as the problems referred to above are solved by taking advantage of the practical need to eliminate low-temperature peaks.

With this objective, the invention proposes a method of reading thermoluminescent dosimeters wherein the dosimeter is heated from the initial temperature thereof to a predetermined temperature which is higher than the range of emission of peaks which are subject to fading, the dosimeter is maintained at this temperature stage for a sufficient period of time to ensure that the emission of peaks which are subject to fading is complete, whereupon the temperature of the dosimeter is immediately and progressively increased from said predetermined temperature to a temperature which is sufficient to cause the emission of all significant peaks and which is lower than the temperature which causes the emission of peaks related to phenomena other than the radiation dose received by the dosimeter and the total light emission of the dosimeter during said temperature rise is then measured.

The invention also proposes a device for carrying out the aforesaid method and will be more readily understood from the following description of one application of the invention which is given by way of nonlimitative example. Reference is made in the description to the accompanying drawings, in which.

Figure 1:
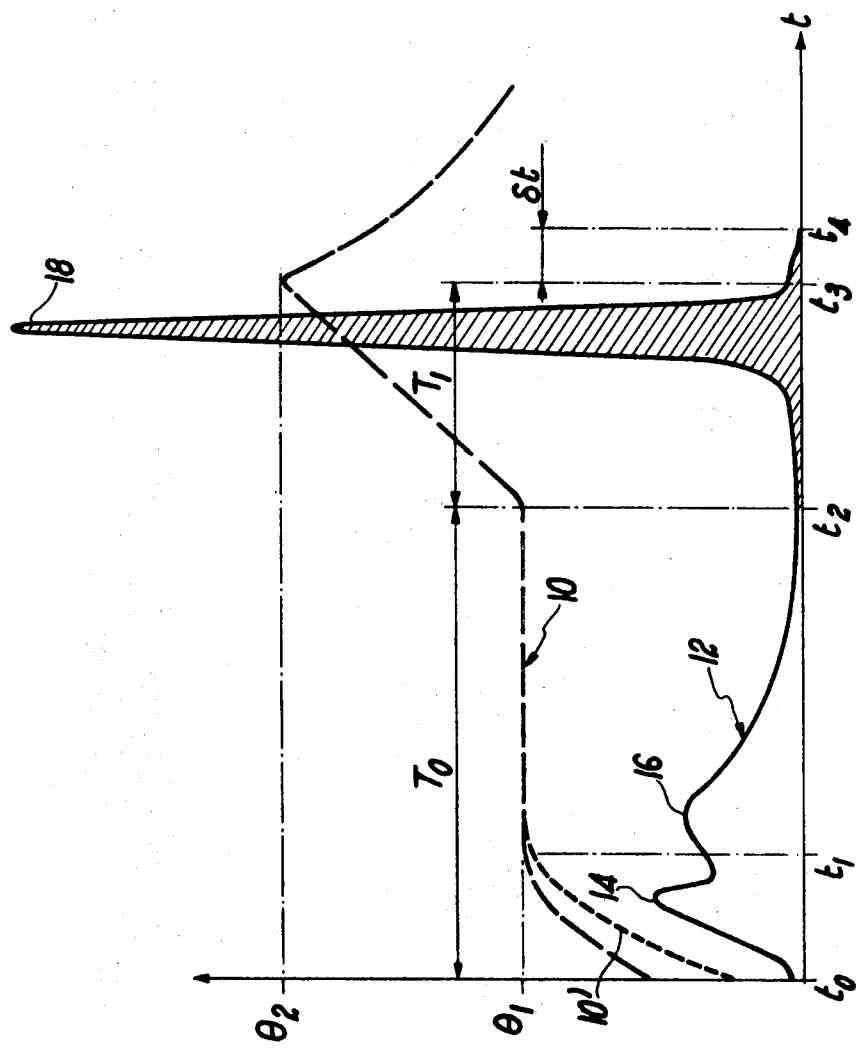
FIG. 1 is a diagram representing the variations in time both of the temperature and the light emission in the case of application of the method to a lithium fluoride dosimeter.

For the sake of greater clarity of the description, the principle of the method will first be explained with reference to FIG. 1. The dosimeter (formed for example by a sintered pellet of lithium fluoride powder) is heated as soon as it is placed in a reader of any suitable type to a very variable temperature which depends on the length of the time interval which has elapsed since the previous reading. Thus, during a first step of the method according to the invention or so-called preheating step, the dosimeter will be heated to a predetermined level-temperature stage which is made independent of the initial temperature by means of a suitable regulation and maintained at that level for a sufficient period of time to achieve complete removal of peaks which are subject to fading without measurement of light emission. The curve 10 of FIG. 1 shows by way of example the preheating which is carried out from an initial temperature of 70° C.: from the initial instant $t_0$ to the instant $t1$, the dosimeter is brought from its initial temperature to the level-temperature stage $\theta_1$ on the order of 130° C. Preheating is carried on from the instant $t1$ to the instant $t2$ by maintaining the level-temperature stage. During the preheating step, the dosimeter emits a quantity of light represented in the figure by the area between the curve 12, the time axis and the lines corresponding to the times $t_0$ and $t_2$. In practice, the two peaks 14 and 16 can be completely eliminated by providing a time interval $t_2-t_0$ of at least 15 seconds irrespective of the time interval $t_2-t_0$. This latter can in any case be made relatively constant over a wide range of initial temperatures by modulating the heating as a function of the temperature of the dosimeter: in the case illustrated in FIG. 1, this temperature rise lasts a few seconds and the level-temperature is stabilized at 130° C., whether the starting temperature is 70° C. (curve 10) or 30° C (curve 10').

During a second step which constitutes the reading proper, the dosimeter is brought from the level-temperature stage $\theta_1$ to a maximum temperature $\theta_2$ on the order of 250° C. The temperature $\theta_2$ is chosen so as to cause the emission of virtually the entire significant peak 18 but not to attain subsequent peaks. The temperature variation between $\theta_1$ and $\theta_2$ can be substantially linear as shown in FIG. 1 but this is by no means an essential requirement.

The time interval $t_3-t_2$ between the end of the preheating and final stopping of the heating operation can vary over a wide range but is preferably of the order of 10 seconds.

After the instant $t_3$, the temperature decreases again first at a high rate then at a much lower rate so as to reach the stage $\theta_1$ in a very short time and then to pass below this latter although a much longer period of time is necessary in order to return to ambient temperature.

The light emission caused by heating to the temperature $\theta_2$ is integrated from the instant $t_2$ (beginning of the temperature rise) to an instant $t_4$ occuring a few seconds after the instant $t_3$ at which the heating is cutoff and chosen so as to allow only a small fraction of the significant peak 18 to escape: this emission corresponds to the shaded surface in FIG. 1.

In the case of thermoluminescent dosimeters which are formed of materials other than LiF, the temperatures $\theta_1$ and $\theta_2$ to be adopted would evidently have values other than those given in the foregoing. In the case of lithium borate, it is possible to adopt the values $\theta_1=90°$ C. and $t_2-t_0=5$ secs. The maximum value of the peak 18 in the case of this compound is located about 190° C. In the case of alumina $Al_2O_3$ which is crystallized in the alpha phase, the values adopted can be $\theta_1=180°$ C. and $t_2-t_0=15$ secs. The emission peak exhibits a maximum at about 240° C. and a value of $\theta_2=290°$ C. (approx.) can be adopted.

Figure 2:
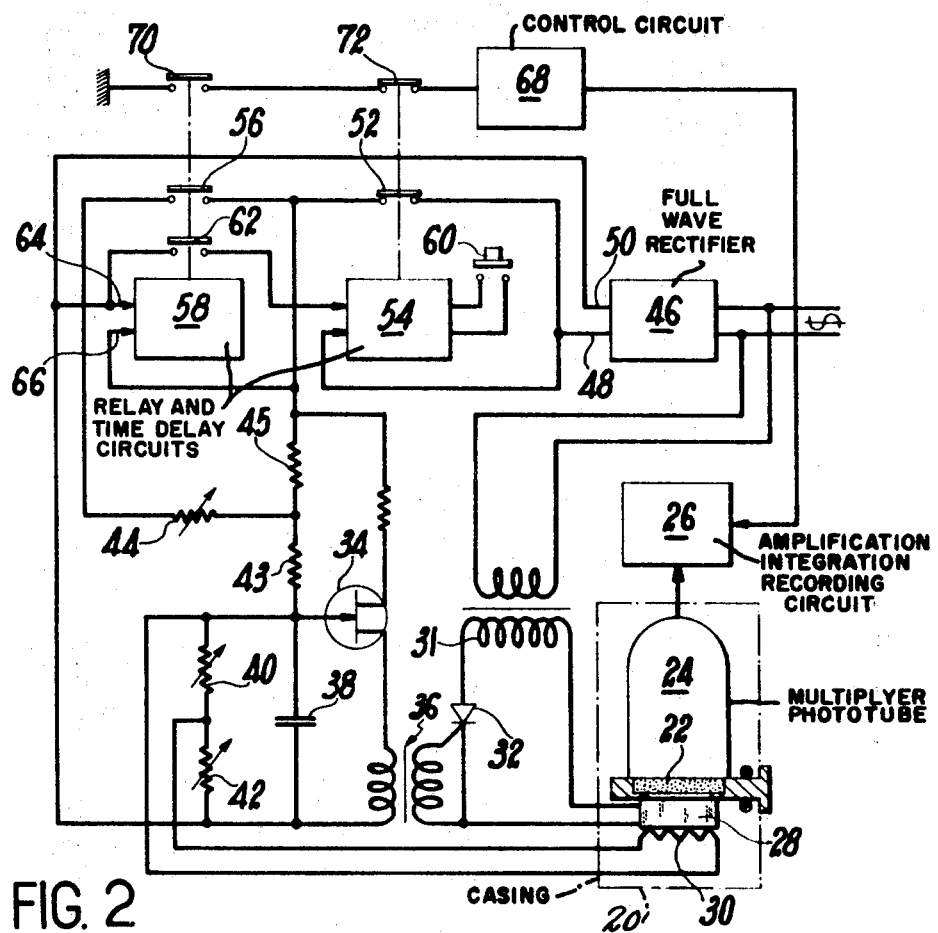
FIG. 2 is a highly simplified diagram of the device for heating a dosimeter.

FIG. 2 shows by way of example the diagram of the heating control circuits of a reader which carries out the method described in the foregoing. The mechanical components employed in this reader are of wholly conventional type: a light-tight casing 20 is fitted with a drawer for the insertion of the dosimeter 22. The casing contains a multiplier phototube 24 which is located opposite to the dosimeter when this latter has been inserted. The multiplier phototube 24 drives an amplification, integration and recording circuit which is generally designated by the reference 26. A heating plate 28 which is fitted with a resistor (not shown in the fig.) and which is supplied from a transformer 31 via a semiconductor controlled rectifier or thyristor 32 serves to heat the dosimeter 22 when this latter is in position.

There is associated with the plate 28 a thermistor 30 which has low thermal inertia and is placed either in the vicinity of or in contact with the plate. Said thermistor constitutes the element which is responsive to variations in temperature of the heating plate 28 and of the dosimeter 22 of the thyristor control circuit. This control circuit comprises a unijunction transistor 34. The emitter circuit of said transistor which drives the control electrode of the thyristor 32 through a transformer 36 oscillates at a frequency which is fixed by a resistor-capacitor circuit. The capacitor 38 has a fixed value while the resistor is formed by the association of a plurality of elements, a number of which are permanently connected in circuit whereas others are either switched in automatically or separated by relays which control the transition from one reading step to the next.

It should be noted that the transistor is supplied from the same main current source as the transformer 31 of the heating circuit by means of a full-wave rectifier 46 as will become apparent hereinafter. By virtue of this arrangement, and provided that the output of the rectifier 46 is not filtered, the voltage applied to the unijunction transistor 34 returns substantially to zero twice per cycle in synchronism with the voltage applied to the thyristor 32. Thus, the pulse emitted by the transistor are reset at each supply cycle and synchronization is thus achieved.

The resistance elements which are permanently connected in circuit comprise two variable resistors 40 and 42 which are connected in series and in parallel with the capacitor 38. The resistor 42 makes it possible to modify the level-termperature stage $\theta_1$. The resistor 40 which is shunted by the thermistor 30 constitutes a means for adjusting the slope of the curve of initial temperature rise to the temperature stage $\theta_1$. The elements which are temporarily connected (during the period of temperature rise for the purpose of reading the peak 18) essentially comprise a resistor 44 of adjustable value. This resistor is either cut out of circuit or connected in parallel with one of the two resistors which are interposed between the emitter of the unijunction transistor 34 and the supply 46.

It is possible, for example, to employ resistors 42, 44 and 45 having a value of 10 kilohms and a resistor 43 having a value of 1 kilohm. The capacitor 38 can in that case have a value of $0.22\mu F$. The thermistor can be approximately 8 kilohms in value.

Switching-on of the circuit and changes of connection are carried out by means of conventional electronic time-delay circuits which are designed to carry out the above-described sequence of operations as a result of opening and closing of relays. The rectifier 46 delivers between its positive output 48 and its negative output 50 a full-wave rectified voltage. By means of a blade 52 forming part of a relay which is controlled by the pushbutton 60, the positive output 48 is connected directly to the resistor 45 and to the time-delay circuit 58; the output 48 is also connected to the resistor 44 by means of the blade 56 of a relay 58 which forms part of the first time-delay circuit when said relay is energized. The blade 52 is actuated by means of a pushbutton 60. The second time-delay circuit 54 opens the blade 52 at the end of a time-delay $T_1$ after application of the supply voltage between two control terminals 61. One of said terminals is permanently connected to the positive output 48. The other terminal is connected to the negative output 50 as a result of the closure of a blade 62 which is controlled by the same relay as the blade 56.

The blades 56 and 52 are moved by means of the time-delay circuit 58 to the position of closure at the end of a time-delay $T_o$ after application of the voltage of the rectifier 46 between the control terminals 64 and 66 of said circuit.

The terminal 64 is permanently connected to the negative output 50 of the circuit 46. On the other hand, the input 66 is connected to the positive terminal when the blade 52 is closed, that is to say when the relay controlled by the pushbutton 60 is energized.

The operation of the device will have become readily apparent from the foregoing description and will therefore be indicated only briefly: the alternating-current input of the rectifier circuit is supplied with current and the rectifier 46 delivers a rectified voltage at the outputs 48 and 50 but no voltage is applied to the unijunction transistor 34: the thyristor 32 remains blocked and does not deliver any power to the heating plate 28.

Figure 3:
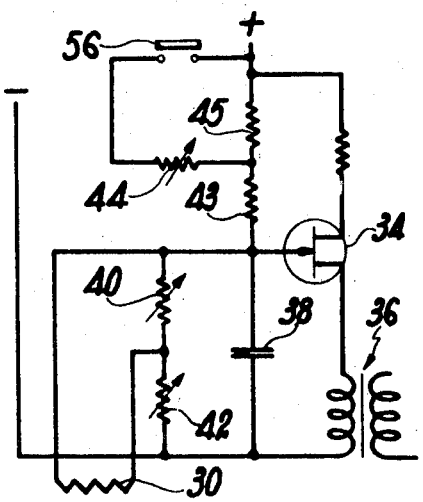
FIG. 3 is a detail diagram showing the circuit which is directly associated with the unijunction transistor illustrated in FIG. 2 at the time of the preheating step (initial temperature rise and maintenance of temperature at a level stage).

Once a dosimeter has been inserted beneath the multiplier phototube 24, the operator depresses the pushbutton 60 in order to cause the closure of the blade 52. The positive voltage derived from the output 48 is then applied to the emitter of the transistor. Thus, the connections are as shown in FIG. 2 and the unijunction transistor is accordingly associated with the elements shown in FIG. 3 and only with these latter. The transistor 34 oscillates with resetting while the voltage at the terminals of the thyristor is also zero. The frequency of the pulses which appear in the transformer 36 is essentially dependent on the value of the variable resistors 40 and 42 and on the value of the thermistor 30 which has at the instant $t_0$ a relatively low value which depends on the initial temperature applied. During the initial temperature-rise step (from the instant $t_0$ to the instant $t_1$), the thermistor 30 has a low value compared with that of the resistors 40 and 42 and it is the value of this latter which establishes the temperature-rise slope. When the temperature of the plate comes close to the selected value $\theta_1$, the value attained by the thermistor is such that the time lag after the unijunction transistor 34 has been turned on becomes substantial and such that the angle of opening of the thyristor 32 (and therefore the power delivered to the heating plate) decreases until the temperature is maintained at the value $\theta_1$.

As it closes, the blade 52 triggers the time-delay circuit 58 and this latter energizes the relay which closes the blades 62 and 56 at the end of the time interval $T_o$, the value of which is chosen to correspond to the time interval $T_2-T_o$ which is indicated in FIG. 1. As a result of closure of the blade 56, the variable resistor 44 is connected in parallel with the resistor 45, modifies the supply voltage applied to the emitter of the unijunction transistor 34 and the resistor-capacitor circuit of this latter, and produces a further temperature rise which is substantially linear at least in its initial phase. The slope of said temperatures rise can be varied by adjusting the resistor 44. The blade 62 closes at the same time as the blade 56 and the time-delay circuit 54 after expiry of a time interval $T_1$ which is chosen so as to be equal to $t_3-t_2$, energizes a relay for opening the blade 52 and cuts off the supply to the entire circuit: the relay of the circuit 58 opens the blades 56 and 62 and the circuit is ready to operate for a further reading sequence.

The time-delay circuits 58 and 54 can be employed for the purpose of controlling not only the heating but also the recording of the light emission from the instant $t_2$ to the instant $t_4$. Thus, in the embodiment which is illustrated in FIG. 2, a circuit 68 for controlling the chain 26 is energized at the time of closure of one input in which are disposed tow blades 70 and 72 which are synchronized respectively with the blades 56 and 52; this circuit 68 stops the recording after a period of time $\delta t$ which is equal to $t_4-t_3$ after opening of the input. Since the blade 70 is closed from the instant $t_2$ and the blade 72 is closed from the instant $t_0$ to the instant $t_3$, the circuit 68 will inhibit the chain 26 except between the instants $t_2$ and $t_4$.

It is readily apparent that the invention is not limited to the modes of application which have been described in the foregoing by way of example.

What we claim is:

1. A method of reading thermoluminescent dosimeters comprising heating the dosimeter from its initial temperature to a predetermined first temperature which is higher than the range of emission of peaks which are subject to fading, maintaining the dosimeter at said predetermined temperature for a sufficient period of time to ensure that the emission of peaks which are subject to fading is complete, immediately and progressively increasing the temperature of the dosimeter from said predetermined first temperature to a second temperature which is sufficient to cause the emission of all significant peaks and which is lower than the temperature which causes the emission of peaks related to phenomena other than the radiation dose received by the dosimeter and measuring the total light emission of the dosimeter during said temperature rise.

2. A method in accordance with claim 1 for reading lithium fluoride dosimeters wherein the first temperature is on the order of 130° C. and i is maintained for several seconds and the second temperature is on the order of 250° C.

3. A method in accordance with claim 1 for reading doped lithium borate dosimeters wherein the first temperature is on the order of 90° C. and is maintained for a period of several seconds.

4. A method in accordance with claim 1 for reading δ-phase alumina dosimeters wherein the first temperature is on the order of 180° C. and is maintained for a period of at least 15 seconds.

5. A device for reading thermoluminescent dosimeters, comprising a plate receiving the dosimeter a heating resistor for said plate supplied from an alternating-current system through a thyristor, a circuit for controlling said thyristor comprising a unijunction transistor supplied with rectified current from said system a resistor-capacitor circuit for said transistor including a thermistor responsive to the temperature of said plate which limits the power supplied to said heating resistor to a value corresponding to the maintenance of a predetermined temperature and contains at least one element insertable in parallel with resistors connectable in the circuit to cause a rise of the temperature of said plate sufficient to cause the emission of all significant peaks.

6. A device in accordance with claim 5, wherein said resistor-capacitor circuit comprises a fixed capacitor and two variable resistors mounted in series and in shunt across said capacitor, said thermistor being placed in parallel with one of said variable resistors.

7. A device in accordance with claim 5, wherein said insertable element consists of a variable resistor inserted in parallel with a fixed resistor interposed between the emitter of said unijunction transistor and the positive pole of said rectified current to cause a temperature rise.

8. A device in accordance with claim 7, including two time-delay circuits, one of said circuits actuating a relay for putting said variable resistor in circuit at the end of a predetermined time interval corresponding to the preheating time, the other of said circuits maintaining said resistor in circuit for a time interval which corresponds to the reading time.